Jan. 28, 1964
H. F. ROEHN, JR
3,119,353
ICE CREAM SANDWICH MACHINE
Filed Jan. 8, 1962
2 Sheets-Sheet 1
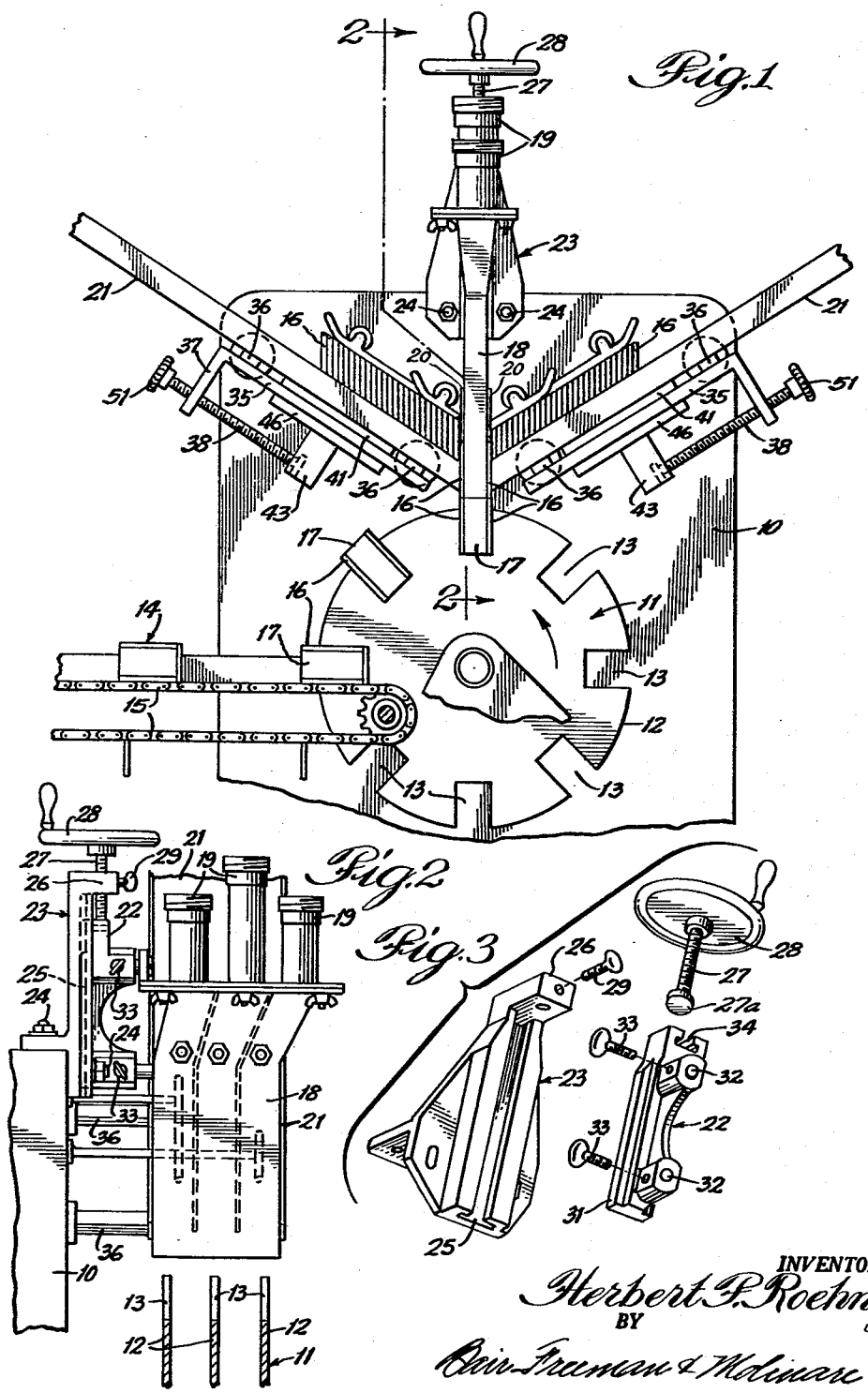
INVENTOR:
Herbert F. Roehn Jr.,
BY
Boir, Freeman & Molinare
ATTORNEYS.

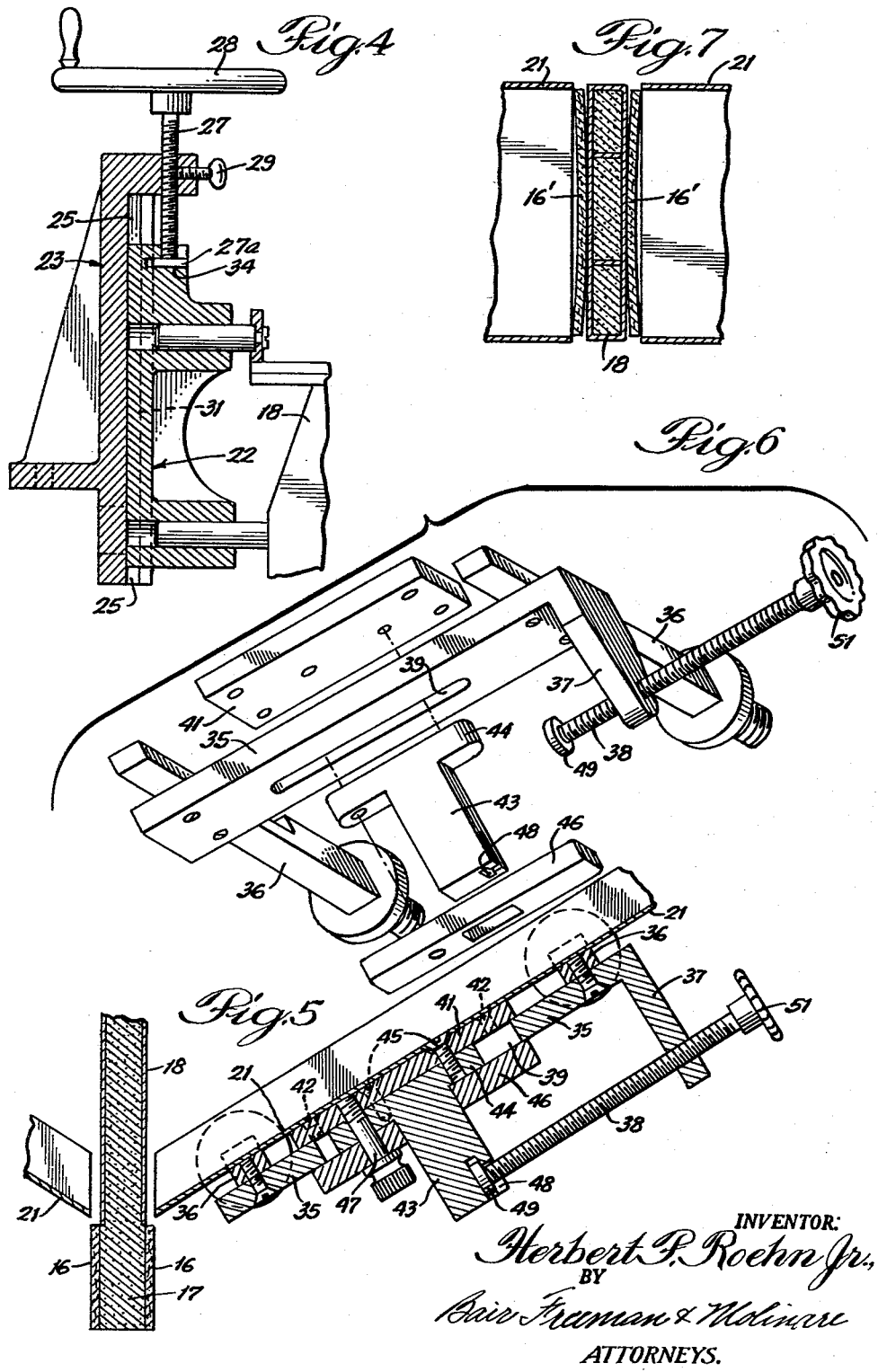

United States Patent Office 3,119,353
Patented Jan. 28, 1964

3,119,353
ICE CREAM SANDWICH MACHINE
Herbert F. Roehn, Jr., Chicago, Ill., assignor to Bates Packaging Services, Inc., a corporation of Illinois
Filed Jan. 8, 1962, Ser. No. 164,776
4 Claims. (Cl. 107—1)

This invention relates to an ice cream sandwich machine and more particularly to a machine for automatically making ice cream sandwiches consisting of flat wafers with a layer of ice cream between them. The present invention relates specifically to machines of the type in which wafers and ice cream are fed downwardly into pockets in a rotor to form the sandwiches. In such machines the wafers are supplied to opposite sides of an ice cream nozzle from sloping trays to pass between the ends of the trays and the nozzle. The ice cream is fed downwardly in a stream through the nozzle between the wafers and is cut off at the nozzle by movement of the upper edge of one of the wafers in the rotor pocket as the rotor turns.

In machines of this type, difficulties may be encountered in feeding the wafers properly through the spaces between the sides of the nozzle and the edges of the trays due to variations in thickness of the wafers or, as is more common, warping of the wafers. If the spaces are designed to pass straight wafers of normal thickness warped wafers cannot pass through them. If, on the other hand, the spaces are made wide enough to pass warped wafers, two straight wafers are apt to jam in them.

Another difficulty results from variation in the width of the wafers. Since the wafers in the rotor pockets themselves wipe off or cut off the stream of ice cream coming from the nozzle as the rotor turns, the nozzle must be positioned relative to the rotor so that the edges of the wafers will move closely across it. If the nozzle is spaced sufficiently far from the rotor to accommodate the widest wafer narrower wafers will smear the ice cream so that the sandwiches will be unacceptable.

It is accordingly an object of the present invention to provide an ice cream sandwich machine in which the sloping wafer trays are mounted for easy and accurate adjustment to vary the spacing thereof from the sides of the nozzle to accommodate variations in the wafers.

According to a feature of the invention the wafer trays are carried by followers slidable in guide slots in supporting plates and connected to the supporting plates by adjusting screws for moving the trays easily and accurately even while the machine is in operation.

Another object is to provide an ice cream sandwich machine in which the nozzle is mounted for easy and accurate adjustment to vary the spacing thereof from the rotor.

According to a feature of the invention, the nozzle is mounted on a supporting member which in turn is slidably supported on a fixed guide member and which is connected to the fixed guide member by an adjusting screw for moving the nozzle vertically even while the machine is in operation.

The above and other objects and features of the invention will be more readily apparent from the following description when read in connection with the accompanying drawings, in which:

FIGURE 1 is a partial end elevation of an ice cream sandwich machine embodying the invention;

FIGURE 2 is a section on the broken line 2—2 of FIGURE 1;

FIGURE 3 is a disassembled perspective view of the nozzle supporting member and guide member;

FIGURE 4 is a sectional view through the assembled supporting member and guide member;

FIGURE 5 is a sectional view through one of the wafer trays and the adjustable supporting means therefor;

FIGURE 6 is a disassembled perspective view of the tray supporting and adjusting means and FIGURE 7 is a view looking upward toward the bottom of the nozzle illustrating the passing of wafers through the spaces between the nozzle and the trays.

The ice cream sandwich machine, as shown in FIGURE 1, comprises a supporting framework, indicated generally at 10, which carries the driving mechanism for operating the rotor and the conveyor. A rotor 11 is mounted on the framework for rotation on a horizontal axis and is formed, as best seen in FIGURE 2, by three spaced plates 12. The plates are formed with aligned notches 13 in their peripheries defining pockets to receive the wafers and ice cream and in which the sandwiches are formed. The rotor is driven in a step-by-step manner so that it is stationary during formation of a sandwich and moves through one step after a sandwich is completed ready for the next sandwich to be formed. Completed sandwiches, as indicated at 14, are removed from the rotor by a conveyor 15 and are preferably carried to a wrapping section of the machine where they are wrapped. Each sandwich, as shown, comprises a pair of spaced wafers 16 which are relatively flat thin wafers of rectangular outline with a filling 17 of ice cream between them.

The ice cream is supplied through a vertical nozzle 18 which is illustrated as being of the type more particularly described and claimed in my co-pending application Serial No. 134,345, filed August 28, 1961. It will be understood, of course, that other types of nozzles for dispensing only a single flavor of ice cream may be employed. In either case, the nozzle terminates in a rectangular lower portion open at its bottom of a width approximately equal to the thickness of the ice cream filling desired and of a length corresponding to the length of the wafers 16. Ice cream is supplied to the upper end of the nozzle through one or more connections 19 under sufficient pressure to force the ice cream downward through the nozzle and out the lower end thereof.

The wafers 16 are supplied to opposite sides of the nozzle from angularly sloping trays 21 each of which receives a stack of wafers, as shown, with the wafers feeding by gravity to positions against the opposite sides of the nozzle. The lower edges of the trays are spaced from the sides of the nozzle so that the wafers can drop through these spaces alongside the nozzle into the pockets 13 in the rotor.

In operation of the machine as so far described with the trays filled with wafers and ice cream being supplied to the nozzle, two of the wafers are pushed down on opposite sides of the nozzle by plates 20 which correspond to propelling plates 104 of the patent to E. J. Rapp, No. 2,794,404, issued June 4, 1957, and are likewise formed integrally on a vertically slidable sleeve corresponding to sleeve 100 of said patent, into the uppermost pocket in the rotor and a stream of ice cream will be forced between the wafers to form a sandwich. After the sandwich has been formed, the rotor is turned rapidly through one step in a counterclockwise direction, as seen in FIGURE 1, so that the upper edge of the trailing wafer 16 will wipe across the discharge end of the nozzle to cut off the stream of ice cream therefrom. When the next pocket comes into registration with the nozzle, the next two wafers are pushed down into the pocket as the stream of ice cream flows between them. This operation will continue as long as there are wafers in the trays and as long as ice cream is supplied to the nozzle.

It will be seen that in this operation it is necessary that the position of the nozzle relative to the rotor be such that the upper edge of a wafer in the rotor pocket will wipe closely across the discharge end of the nozzle to wipe off or cut off the stream of ice cream cleanly from the nozzle without smearing. Since there is a variation in the width of the wafers as between different batches, it is desirable to be able to adjust the position of the nozzle relative to the rotor easily and accurately. For this purpose, according to the present invention, the nozzle is carried by a supporting member 22 which is mounted for vertical sliding movement in a guide member 23. As shown, the guide member 23 is rigidly attached to the frame 10 as by means of bolts or screws 24, as best seen in FIGURE 2, and is provided with a vertical recessed or dovetailed slot 25, as best seen in FIGURE 3. At its upper end the guide member is formed with an outwardly extending flange or lug 26 formed with a threaded opening therein through which an adjusting screw 27 is threaded. For convenience a handwheel 28 may be carried by the upper end of the adjusting screws and a lock screw 29 may be threaded into the flange 26 to lock the adjusting screw 27 in adjusted position.

The supporting member 22 is formed at one edge with flanges 31 to fit into the recessed or dovetailed slot 25 so that the supporting member is mounted on the guide member for vertical sliding movement. The supporting member is provided with a pair of outwardly opening sockets 32 which receive mounting pins carried by the nozzle. Locking screws 33 may be threaded into the sockets 32 to engage the mounting pins and hold the nozzle securely in place. At its upper end the supporting member is formed with a recessed socket 34 rotatably to receive a disc 35 on the lower end of the adjusting screw 27.

When the parts are assembled, as shown in FIGURES 1, 2 and 4, the vertical position of the nozzle relative to the rotor can easily be adjusted simply by releasing the locking screw 29 and turning the handwheel 28 to move the adjusting screw 27 vertically. Due to the rotatable connection of the adjusting screw with the supporting member the supporting member and nozzle will be moved vertically. It will be seen that this adjustment can be made with an extremely high degree of accuracy and without any disassembling of the parts so that it can be accomplished even while the machine is in operation. This constitutes a great advantage since stopping of the machine interferes with the desired consistency of the ice cream and results in wastage of ice cream if not also of wafers.

According to another feature of the invention, the wafer trays 21 are mounted for adjustment toward and away from the sides of the nozzle 18 to adjust the spaces through which the wafers drop from the trays into the rotor. For this purpose, a fixed supporting plate 35 is provided underlying each of the trays and elongated in the direction of the length of the trays. The supporting plates 35, as best seen in FIGURE 6, are rigidly mounted on supporting arms 36 secured to and projecting outward from the frame 10. Each supporting plate is formed at the end remote from the nozzle 18 with a downwardly extending flange 37 through which an adjusting screw 38 is threaded and is further formed in its central portion with an elongated guide slot 39.

Each of the trays is fixedly secured to a follower member including a flat plate 41 underlying the tray and secured thereto by fastening screws 42. A post member 43 is provided with an elongated narrow base 44 of a size and shape to fit slidably in the guide slot 39 and is rigidly secured to the plate 41 by fastenings such as screws 45. Upward movement of the trays relative to the supporting plates is limited by retaining blocks 46 fitting over the posts 43 and of a size to underlie the supporting plates 35 at the sides and ends of the slots 39 therein and rigidly secured to the post base 44 and the plates 41 by screws 47. The screws 47 may, as shown, be thumb screws for easy removal so that the parts can easily be disassembled for cleaning.

Each of the posts 43 is formed in its outer end with an undercut recess 48 to receive a circular disc 49 at the end of the adjusting screw 38. Each adjusting screw may be provided with a handwheel 51 for ease of operation thereof.

With the parts assembled, as shown in FIGURES 1 and 5, the trays are accurately held at the desired angle by the supporting plate 35 with the lower ends thereof spaced from opposite sides of the nozzle 18. The lowermost wafer on each tray will pass between the spaces between the sides of the nozzle and the lower edges of the trays to drop into the pockets in the rotor with ice cream from the nozzle being filled in between them to form a sandwich.

If all of the wafers were of uniform thickness and were flat, it would be an easy matter to set the trays in a position such that the wafers would properly pass between the lower edges of the trays and the sides of the nozzle. However, as illustrated in FIGURE 7, certain of the wafers shown at 16' may be bent or warped so that they could not pass between a normal space as provided for flat wafers. In this case, it becomes necessary to widen the space so that the warped wafers can pass through it into the rotor.

For this purpose, the adjusting screw 38 may be turned in the proper direction to cause the post 43, plate 41 and the tray 21 carried thereby to be shifted lengthwise relative to the nozzle to adjust the space through which the wafers are intended to drop. It will be seen that this adjustment can be made very easily and with a high degree of accuracy without any disassembly of any parts and without even stopping the operation of the machine. Thus, as variations in different batches of wafers occur during operation of the machine adjustments can be made easily and quickly to accommodate the wafers then in the trays so that wastage is minimized and loss of time is substantially eliminated.

While one embodiment of the invention has been shown and described herein, it will be understood that it is illustrative only and not to be taken as a definition of the scope of the invention, reference being had for this purpose to the appended claims.

What is claimed is:

1. An ice cream sandwich machine comprising a vertical ice cream nozzle having flat sides and open at its bottom for discharge of ice cream therefrom, a pair of wafer trays on opposite sides of the nozzle extending downwardly at acute angles to horizontal toward the nozzle and terminating at a level above the open bottom of the nozzle, a rotor below the nozzle formed with pockets therein to receive wafers from the trays and ice cream from the nozzle in the form of a sandwich, a fixed guide member mounted adjacent to one edge of the nozzle and having a vertical dovetailed guide slot therein, a supporting member fixed to the nozzle and having a vertical flanged edge portion fitting in the slot for free sliding movement, a horizontal bracket on the upper end of the guide member overhanging the supporting member, a vertical screw threaded into the bracket and extending downwardly toward the supporting member, and means providing for free relative rotation but preventing relative vertical movement in either direction connecting the lower end of the screw and the upper end of the supporting member whereby when the screw is turned the supporting member and nozzle will be moved vertically and will be held in their vertically adjusted position against movement in either direction.

2. An ice cream sandwich machine comprising a vertical ice cream nozzle having flat sides and open at its bottom for discharge of ice cream therefrom, a pair of wafer trays on opposite sides of the nozzle extending downwardly at acute angles to horizontal toward the nozzle and terminating at a level above the open bottom of the nozzle, a rotor below the nozzle formed with pockets therein to receive wafers from the trays and ice cream from the nozzle in the form of a sandwich, a fixed supporting plate for each of the trays underlying the tray and formed with an elongated guide slot therein, a follower member secured to each tray and fitting slidably in the guide slot of the corresponding supporting plate to guide the tray for linear movement toward and away from the nozzle, and means including a screw connecting the plate and follower member for moving the tray toward and away from the nozzle.

3. An ice cream sandwich machine comprising a vertical ice cream nozzle having flat sides and open at its bottom for discharge of ice cream therefrom, a pair of wafer trays on opposite sides of the nozzle extending downwardly at acute angles to horizontal toward the nozzle and terminating at a level above the open bottom of the nozzle, a rotor below the nozzle formed with pockets therein to receive wafers from the trays and ice cream from the nozzle in the form of a sandwich, an elongated supporting plate fixedly mounted beneath each of the trays, each supporting plate having an elongated guide slot therein parallel to the tray and a downwardly extending flange at one end, a follower rigidly secured to each tray and extending through the guide slot in the corresponding plate to guide the tray for linear movement toward and away from the nozzle, a screw threaded through the flange on each plate, and rotatable connections between the screws and followers respectively to move the followers and trays as the screws are turned.

4. An ice cream sandwich machine comprising a vertical ice cream nozzle having flat sides and open at its bottom for discharge of ice cream therefrom, a pair of wafer trays on opposite sides of the nozzle extending downwardly at acute angles to horizontal toward the nozzle and terminating at a level above the open bottom of the nozzle, a rotor below the nozzle formed with pockets therein to receive wafers from the trays and ice cream from the nozzle in the form of a sandwich, a fixed supporting plate for each of the trays underlying the tray and formed with an elongated guide slot therein, a follower member secured to each tray and fitting slidably in the guide slot of the corresponding supporting plate to guide the tray for linear movement toward and away from the nozzle, means including a screw connecting the plate and follower member for moving the tray toward and away from the nozzle, an elongated supporting plate fixedly mounted beneath each of the trays, each supporting plate having an elongated guide slot therein parallel to the tray and a downwardly extending flange at one end, a follower rigidly secured to each tray and extending through the guide slot in the corresponding plate to guide the tray for linear movement toward and away from the nozzle, a screw threaded through the flange on each plate, and rotatable connections between the screws and followers respectively to move the followers and trays as the screws are turned.

References Cited in the file of this patent

UNITED STATES PATENTS 2,794,404     Rapp _____ June 4, 1957